United States Patent
Tang et al.

(10) Patent No.: US 12,432,158 B2
(45) Date of Patent: Sep. 30, 2025

(54) DATA TRANSMISSION METHOD AND RELATED DEVICE

(71) Applicant: HUAWEI TECHNOLOGIES CO., LTD., Shenzhen (CN)

(72) Inventors: Feilong Tang, Shanghai (CN); Wenfu Wu, Shanghai (CN); Hancheng Li, Shanghai (CN); Jinhao Yu, Shanghai (CN); Guangxiong Wu, Shanghai (CN); Long Chen, Shanghai (CN); Cheng Yao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 359 days.

(21) Appl. No.: 17/974,769

(22) Filed: Oct. 27, 2022

(65) Prior Publication Data

US 2023/0043387 A1 Feb. 9, 2023

Related U.S. Application Data

(63) Continuation of application No. PCT/CN2021/090165, filed on Apr. 27, 2021.

(30) Foreign Application Priority Data

Apr. 28, 2020 (CN) .......................... 202010348888.3

(51) Int. Cl.
*H04L 47/62* (2022.01)
*H04L 47/24* (2022.01)
*H04L 47/283* (2022.01)
*H04L 47/50* (2022.01)

(52) U.S. Cl.
CPC ...... *H04L 47/6215* (2013.01); *H04L 47/2458* (2013.01); *H04L 47/283* (2013.01); *H04L 47/50* (2013.01)

(58) Field of Classification Search
CPC ............ H04L 47/6215; H04L 47/2458; H04L 47/283; H04L 47/50
See application file for complete search history.

(56) References Cited

U.S. PATENT DOCUMENTS

| | | | |
|---|---|---|---|
| 7,613,167 B2 | 11/2009 | Denney et al. | |
| 8,707,302 B2* | 4/2014 | DeLuca | G06F 16/9535 718/1 |
| 9,461,925 B1* | 10/2016 | Frink | H04L 49/25 |
| 2010/0316470 A1* | 12/2010 | Lert | B65G 1/0485 414/807 |
| 2011/0019563 A1* | 1/2011 | Serrano Solsona | H04L 47/623 370/252 |
| 2021/0352020 A1* | 11/2021 | Iwasawa | H04L 47/50 |

FOREIGN PATENT DOCUMENTS

| | | |
|---|---|---|
| CN | 103974436 A | 8/2014 |
| CN | 105873223 A | 8/2016 |
| CN | 106332251 A | 1/2017 |
| CN | 109818710 A | 5/2019 |

* cited by examiner

*Primary Examiner* — Emmanuel L Moise
*Assistant Examiner* — Xiang Yu
(74) *Attorney, Agent, or Firm* — Maier & Maier, PLLC

(57) ABSTRACT

A data transmission method to reduce a delay. If a network device receives burst data, the network device preferentially sends the burst data. The burst data may be data whose data amount is greater than a data amount threshold.

19 Claims, 3 Drawing Sheets

DATA TRANSMISSION METHOD AND RELATED DEVICE

CROSS-REFERENCE TO RELATED APPLICATIONS

This application is a continuation of International Application No. PCT/CN2021/090165, filed on Apr. 27, 2021, which claims priority to Chinese Patent Application No. 202010348888.3, filed on Apr. 28, 2020. The disclosures of the aforementioned applications are hereby incorporated by reference in their entireties.

TECHNICAL FIELD

The embodiments may relate to the communications field, a data transmission method, and a related device.

BACKGROUND

A virtual reality (VR) technology is a new practical technology developed in the 20th century. The virtual reality technology includes a computer, electronic information, and a simulation technology. A basic implementation of the virtual reality technology is that the computer simulates a virtual environment, to give a person a sense of environment immersion. With the continuous development of social productivity and science and technology, various industries have an increasing demand for the VR technology. The VR technology has also enormously progressed and gradually becomes a new scientific and technological field.

The running of VR requires a large amount of data transmission, storage, and powerful computing capabilities. With the development of a 5th generation (5G) mobile communication technology, the generation of virtual images can be migrated from a local host to a cloud. This enables a terminal device to be simpler and reduces user costs. In addition, a higher network speed enables a user to reduce a bad experience such as frame freezing during live broadcast and game playing. This is a low delay function and lays a foundation for large-scale popularization of VR.

When VR traffic bursts (for example, an angle of view of a camera device rotates), in other words, when a large amount of to-be-transmitted data is suddenly received on a link, transmission of instantaneous burst large traffic cannot be completed in time due to insufficient link bandwidth. As a result, a delay increases.

SUMMARY

The embodiments may provide a data transmission method, to reduce a data transmission delay.

According to a first aspect, a data transmission method is provided, and includes:

When burst data appears, a first network device receives the burst data, where the burst data is data whose data amount is greater than a data amount threshold. The first network device sends the burst data and regular data to a second network device in descending order of priorities, so that a priority of the burst data is higher than a priority of the regular data and the burst data is preferentially sent, where the regular data is data whose data amount is not greater than the data amount threshold.

When receiving a large amount of to-be-transmitted data (burst data), a network device preferentially transmits the burst data, to avoid waiting after regular data of multiple users, provide sufficient guaranteed bandwidth, and reduce a transmission delay.

According to the first aspect, in a first implementation, if the regular data includes associated data, the first network device sends the associated data to the second network device, where the associated data is regular data associated with the burst data, and a priority of the associated data is greater than the priority of the burst data.

In the embodiments, if there is associated data that needs to be sent before the burst data, the associated data is preferentially sent, to ensure a data sending sequence, and data accuracy is not affected because the burst data is sent in advance.

According to a second implementation of the first aspect, if the regular data includes data that is about to time out, the first network device increases a priority of the data that is about to time out, where the data that is about to time out is data whose stay duration in the first network device exceeds a duration threshold.

In the embodiments, when the data that is about to time out appears, to ensure that a data sending occasion is within the preset duration threshold, the data that is about to time out may be preferentially sent.

According to a third implementation of the first aspect, the first network device may include a high-priority queue and a low-priority queue, the first network device sends data in the high-priority queue and data in the low-priority queue to the second network device, the sending of the data in the high-priority queue is prior to the sending of the data in the low-priority queue, the burst data is placed in the high-priority queue, and the regular data is placed in the low-priority queue.

In the embodiments, a dual-queue implementation is provided, to adjust the data sending sequence.

According to a fourth implementation of the first aspect, if the low-priority queue includes the associated data, the first network device transfers the associated data from the low-priority queue to the high-priority queue, where the associated data is the regular data associated with the burst data.

According to a fifth implementation of the first aspect, if the low-priority queue includes the data that is about to time out, the first network device transfers the data that is about to time out from the low-priority queue to the high-priority queue, where the data that is about to time out is the data whose stay duration in the first network device exceeds the duration threshold.

A second aspect may provide a network device. The device is used as a first network device and performs the method performed by the first network device in the first aspect.

A third aspect may provide a non-transitory computer storage medium. The non-transitory computer storage medium stores instructions; and when the instructions are run on a computer, the computer is enabled to perform the method in the first aspect.

A fourth aspect may provide a computer program product; and when the computer program product is run on a computer, the computer is enabled to perform the method in the first aspect.

DETAILED DESCRIPTION OF THE EMBODIMENTS

Figure 1:
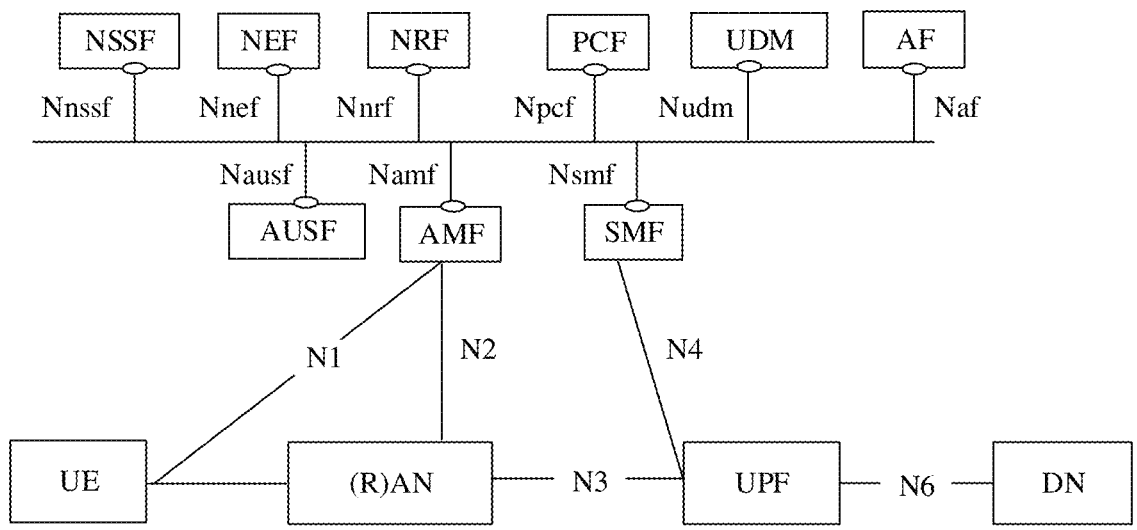
FIG. 1 is a schematic diagram of a network framework according to an embodiment.

As shown in FIG. 1, the network elements may include user equipment (UE), an access and mobility management function (AMF) device, a policy control function (PCF) device, a session management function (SMF) device, and a user plane function (UPF) device.

The PCF device may be used as a unified policy framework to manage network behavior and provide a policy rule for a network entity to implement execution. The PCF device may be used for static bandwidth reservation and allocation and may reserve redundant pool bandwidth for the UPF device of an entire session for use of burst traffic.

After a network device receives related signaling of burst data, the user equipment calculates a status of bandwidth occupied by a VR service session, executes a redundant pool bandwidth scheduling algorithm, returns bandwidth allocation signaling, adjusts bandwidth, and invokes a scheduling method on a forwarding node, to ensure that the burst data can be preferentially transmitted on an intermediate node and avoid congestion.

In the embodiments, "/" may represent an "or" relationship between associated objects. For example, A/B may represent A or B. "and/or" may be used to indicate that there are three relationships between the associated objects. For example, A and/or B may represent the following three cases: only A exists, both A and B exist, and only B exists. A and B may be in a singular form or a plural form. In the embodiments, terms such as "first" or "second" may be used to distinguish between features with a same or similar function. The terms such as "first" or "second" do not limit a quantity and an execution sequence, and the terms such as "first" or "second" do not indicate a definite difference. In the embodiments, terms such as "example" or "for example" are used to represent giving an example, an illustration, or a description. Any embodiment described as "example" or "for example" should not be explained as being more preferred or advantageous over another embodiment. Use of the terms such as "example" or "for example" is intended to present a related concept for ease of understanding.

The network device in the embodiments may include a base station (BS) or a gateway device and may be a device deployed in a radio access network for wireless communication with a terminal device. The base station may be in a plurality of forms, for example, a macro base station, a micro base station, a relay station, and an access point. The gateway device may be a server configured to send data, such as the UPF device or a routing device. The base station in the embodiments may be a base station in a 5G system or a base station in an LTE system. The base station in the 5G system may also be referred to as a transmission reception point (TRP) or a next generation NodeB (gNB). In the embodiments, an apparatus configured to implement a function of the network device may be the network device, or may be an apparatus, for example, a chip system, that can support the network device to implement the function. The apparatus may be deployed on the network device or may be used together with the network device. The embodiments may be described by using an example in which the apparatus configured to implement the function of the network device is the network device.

Figure 2:
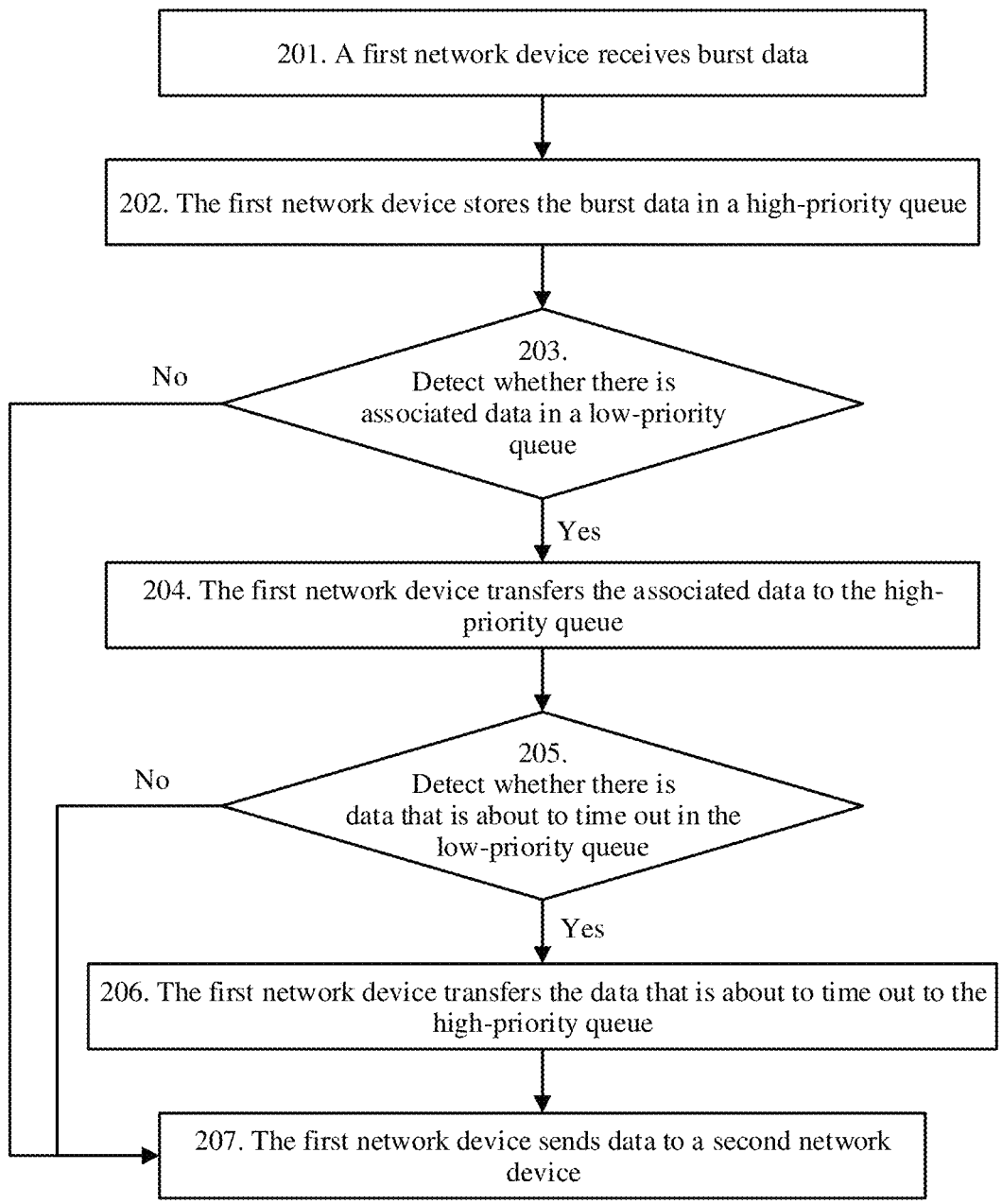
FIG. 2 is a schematic flowchart of a data transmission method according to an embodiment.

With reference to a diagram of a network architecture in FIG. 1, refer to FIG. 2. A data transmission method in an embodiment includes the following steps.

201. A first network device receives burst data.

Figure 3:
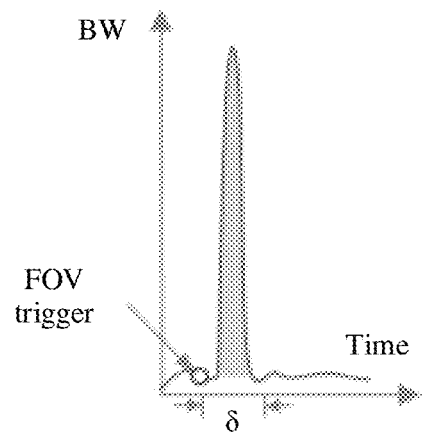
FIG. 3 is a schematic diagram of burst data according to an embodiment.

In some unexpected cases or when a scenario changes, for example, when an angle of view of a camera device rotates, the burst data is generated. As shown in FIG. 3, a size of the burst data may be several times that of regular data, and generally reaches two to three times that of the regular data. In this embodiment, a data amount threshold may be set based on historical data or an empirical value. Data greater than the data amount threshold is the burst data, and data not greater than the data amount threshold is the regular data. It may be understood that the burst data is defined in another manner. For example, it is determined that data generated when the camera device rotates the angle of view or switches a picture is the burst data. A determining manner may be determined based on actual application, and this is not limited herein.

In this embodiment, the burst data may be in a form of a data packet or a data frame. This is not limited herein.

202. The first network device places the burst data in a high-priority queue.

The first network device may be set in a dual-queue scheduling mode and the first network device may include the high-priority queue and a low-priority queue. In a process in which the first network device sends data to a second network device, sending of data in the high-priority queue is prior to sending of data in the low-priority queue.

The first network device places the burst data in the high-priority queue and places the regular data in the low-priority queue without a special indication.

In this embodiment, only a dual-queue scheduling manner is used as an example for description. It may be understood that the first network device may control a data sending sequence in another manner. For example, the first network device adds a priority identifier to the received data, and the first network device sends the data to the second network device based on a priority indicated by the priority identifier. In this case, a priority of the burst data needs to be set to be higher than a priority of the regular data.

203. The first network device detects whether there is associated data in the low-priority queue, and if there is the associated data in the low-priority queue, performs step 204, or if there is no associated data in the low-priority queue, performs step 207.

In this embodiment, the associated data is regular data associated with the burst data. For example, if a burst occurs in a transmission control protocol (TCP) data flow, data that arrives at the first network device earlier should be sent before the burst data.

204. The first network device transfers the associated data to the high-priority queue.

To ensure a sending sequence of the associated data and the burst data, a priority of the associated data may be increased. For example, if the associated data is transferred to the high-priority queue, the first network device adds the associated data to the high-priority queue and deletes the associated data in the low-priority queue. It may be understood that in an implementation process, there may be another manner. For example, the associated data in the low-priority queue is not deleted, and the associated data is used as backup data.

205. The first network device detects whether there is data that is about to time out in the low-priority queue, and if there is the data that is about to time out in the low-priority queue, performs step 206, or if there is no data that is about to time out in the low-priority queue, performs step 207.

To ensure that the data is forwarded to the second network device within preset duration after the data arrives in the first network device, if the data that is about to time out appears, the first network device preferentially sends the data that is about to time out. It may be understood that the data that is about to time out is data whose stay duration in the first network device exceeds a duration threshold, and the threshold may be set based on an actual situation.

206. The first network device transfers the data that is about to time out to the high-priority queue.

The first network device may transfer the data that is about to time out to the high-priority queue, so that the data that is about to time out is preferentially sent. For example, if the data that is about to time out is transferred to the high-priority queue, the first network device adds the associated data to the high-priority queue and deletes the data that is about to time out in the low-priority queue. It may be understood that in an implementation process, there may be another manner. For example, the data that is about to time out in the low-priority queue is not deleted, and the data that is about to time out is used as backup data.

207. The first network device sends the data to the second network device.

The first network device sends the burst data and other regular data to the second network device. In the dual-queue scheduling mode, the first network device preferentially sends the data in the high-priority queue.

In this embodiment, steps 203 and 204 are processing of the associated data, and steps 205 and 206 are processing of the data that is about to time out. There is no time sequence relationship between the steps 203 and 204, and the steps 205 and 206.

Figure 4:
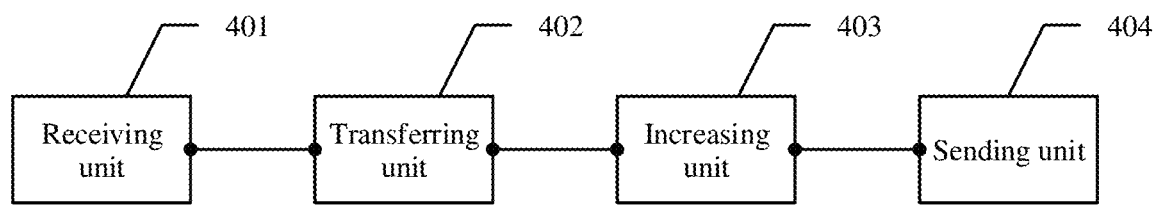
FIG. 4 is a schematic diagram of a structure of a network device according to an embodiment.

The foregoing describes the data transmission method in the embodiments, and the following describes devices in the embodiments. Refer to FIG. 4 and an embodiment of a first network device which may include:

- a receiving unit 401, configured to receive burst data, where the burst data is data whose data amount is greater than a data amount threshold;
- a transferring unit 402, configured to, if a low-priority queue includes associated data, transfer the associated data from the low-priority queue to a high-priority queue, where the associated data is regular data associated with the burst data, and further configured to, if the low-priority queue includes data that is about to time out, transfer the data that is about to time out from the low-priority queue to the high-priority queue, where the data that is about to time out is data whose stay duration in the first network device exceeds a duration threshold;
- an increasing unit 403, configured to, if regular data includes the data that is about to time out, increase a priority of the data that is about to time out, where the data that is about to time out is data whose stay duration in the first network device exceeds the duration threshold; and
- a sending unit 404, configured to send the burst data and the regular data to a second network device in descending order of priorities, where a priority of the burst data is higher than a priority of the regular data, and the regular data is data whose data amount is not greater than the data amount threshold, further configured to, if the regular data includes the associated data, send the associated data to the second network device, where the associated data is the regular data associated with the burst data, and a priority of the associated data is greater than the priority of the burst data, and further configured to send data in the high-priority queue and data in the low-priority queue to the second network device, where the sending of the data in the high-priority queue is prior to the sending of the data in the low-priority queue, the burst data is placed in the high-priority queue, and the regular data is placed in the low-priority queue.

Figure 5:
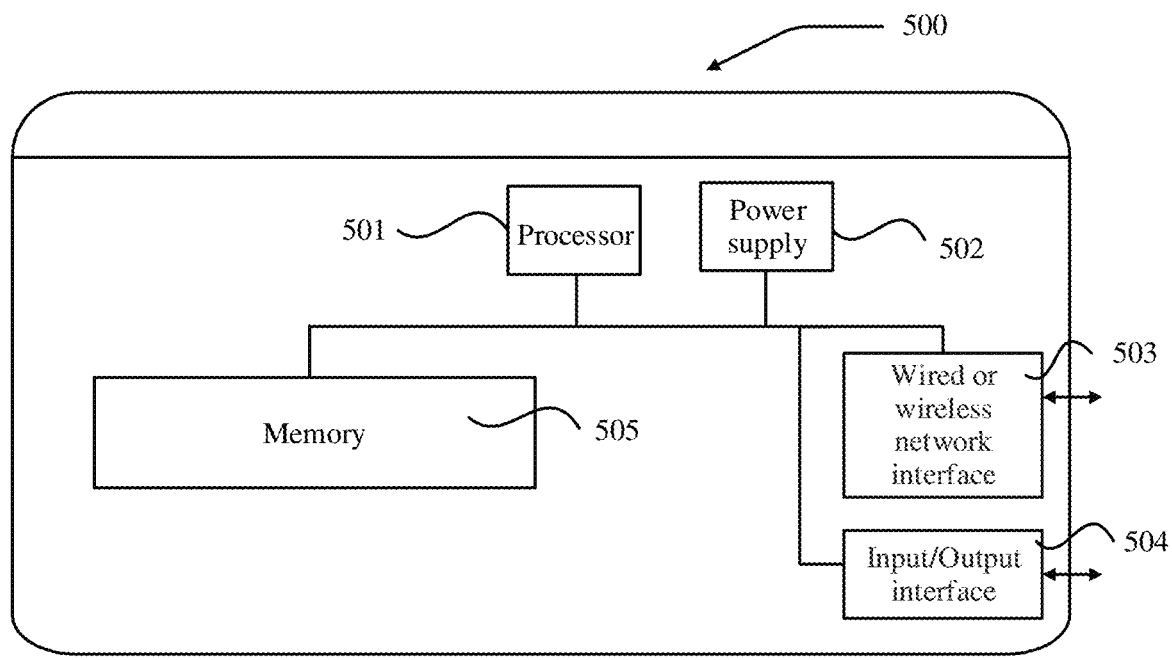
FIG. 5 is another schematic diagram of a structure of a network device according to an embodiment.

The following describes a network device in the embodiments. Refer to FIG. 5. An embodiment of the network device in the embodiments includes:

The network device 500 may include one or more processors 501 and a memory 505. The memory 505 stores one or more application programs or data.

The memory 505 may be volatile storage or persistent storage. The program stored in the memory 505 may include one or more modules, and each module may include a series of instruction operations for the network device 500. Further, the processor 501 may be configured to communicate with the memory 505, and perform, in the network device 500, the series of instruction operations in the memory 505.

The network device 500 may further include one or more power supplies 502, one or more wired or wireless network interfaces 503, one or more input/output interfaces 504, and/or one or more operating systems such as Windows Server™, Mac OS X™, Unix™, Linux™, and FreeBSD™.

The processor 501 may perform the operations performed by the first network device in the embodiment shown in FIG. 2. Details are not described herein again.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments, it should be understood that the system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. A part of or all of the units may be selected based on actual needs to achieve the objectives of the embodiments.

In addition, functional units in the embodiments may be integrated into one processing unit, each of the units may exist alone physically, or two or more units may be integrated into one unit. The integrated unit may be implemented in a form of hardware or may be implemented in a form of a software functional unit.

When the integrated unit is implemented in the form of the software functional unit and sold or used as an independent product, the integrated unit may be stored in a computer-readable storage medium. Based on such an understanding, the embodiments essentially, or the part contributing to the conventional technology, may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

What is claimed is:

1. A data transmission method, comprising:
receiving, by a first network device, virtual reality (VR) burst data, wherein the VR burst data is data produced after an angle of view of a camera rotates whose data amount is greater than a data amount threshold; and
sending, by the first network device, the VR burst data and regular data to a second network device in descending order of priorities, wherein a priority of the VR burst data is higher than a priority of the regular data, and the regular data is data whose data amount is not greater than the data amount threshold.

2. The data transmission method according to claim 1, further comprising:
when the regular data comprises associated data, sending, by the first network device, the associated data to the second network device, wherein the associated data is regular data associated with the VR burst data, and a priority of the associated data is greater than the priority of the VR burst data.

3. The data transmission method according to claim 1, further comprising:
when the regular data comprises data that is about to time out, increasing, by the first network device, a priority of the data that is about to time out, wherein the data that is about to time out is data whose stay duration in the first network device exceeds a duration threshold.

4. The data transmission method according to claim 1, wherein the first network device comprises a high-priority queue and a low-priority queue, the first network device sends data in the high-priority queue and data in the low-priority queue to the second network device, the sending of the data in the high-priority queue is prior to the sending of the data in the low-priority queue, the VR burst data is placed in the high-priority queue, and the regular data is placed in the low-priority queue.

5. The data transmission method according to claim 4, further comprising:
when the low-priority queue comprises the associated data, transferring, by the first network device, the associated data from the low-priority queue to the high-priority queue, wherein the associated data is the regular data associated with the VR burst data.

6. The data transmission method according to claim 4, further comprising:
when the low-priority queue comprises the data that is about to time out, transferring, by the first network device, the data that is about to time out from the low-priority queue to the high-priority queue, wherein the data that is about to time out is the data whose stay duration in the first network device exceeds the duration threshold.

7. The data transmission method according to claim 1, further comprising:
after receiving, by the first network device, the VR burst data, calculating a status of bandwidth occupied by a VR service session.

8. A network device, comprising:
at least one processor; and
a non-transitory memory coupled to the at least one processor and having program instructions stored thereon which, when executed by the at least one processor, cause the network device to:
receive virtual reality (VR) burst data, wherein the burst data is data produced after an angle of view of a camera rotates whose data amount is greater than a data amount threshold; and
send the VR burst data and regular data to a second network device in descending order of priorities, wherein a priority of the VR burst data is higher than a priority of the regular data, and the regular data is data whose data amount is not greater than the data amount threshold.

9. The network device according to claim 8, wherein the instructions, when executed by the at least one processor, further cause the network device to:
send the associated data to the second network device when the regular data comprises associated data, wherein the associated data is regular data associated with the VR burst data, and a priority of the associated data is greater than the priority of the VR burst data.

10. The network device according to claim 8, wherein the instructions, when executed by the at least one processor, further cause the network device to:
increase a priority of the data that is about to time out when the regular data comprises data that is about to time out, wherein the data that is about to time out is data whose stay duration in the network device exceeds a duration threshold.

11. The network device according to claim 8, wherein the network device comprises a high-priority queue and a low-priority queue; and the instructions, when executed by the at least one processor, further cause the network device to:
send data in the high-priority queue and data in the low-priority queue to the second network device, the sending of the data in the high-priority queue is prior to the sending of the data in the low-priority queue, the VR burst data is placed in the high-priority queue, and the regular data is placed in the low-priority queue.

12. The network device according to claim 11, wherein the instructions, when executed by the at least one processor, further cause the network device to:
transfer the associated data from the low-priority queue to the high-priority queue when the low-priority queue comprises the associated data, wherein the associated data is the regular data associated with the VR burst data.

13. The network device according to claim 11, wherein the instructions, when executed by the at least one processor, further cause the network device to:
transfer the data that is about to time out from the low-priority queue to the high-priority queue when the low-priority queue comprises the data that is about to time out, wherein the data that is about to time out is the data whose stay duration in the network device exceeds the duration threshold.

14. A non-transitory computer storage medium, wherein the non-transitory computer storage medium stores instructions thereon which, when executed by a network device, cause the network device to:
- receive virtual reality (VR) burst data, wherein the VR burst data is data produced after an angle of view of a camera rotates whose data amount is greater than a data amount threshold; and
- send the VR burst data and regular data to a second network device in descending order of priorities, wherein a priority of the VR burst data is higher than a priority of the regular data, and the regular data is data whose data amount is not greater than the data amount threshold.

15. The non-transitory computer storage medium according to claim 14, wherein the instructions, when executed by the network device, further cause the network device to:
- send the associated data to the second network device when the regular data comprises associated data, wherein the associated data is regular data associated with the VR burst data, and a priority of the associated data is greater than the priority of the VR burst data.

16. The non-transitory computer storage medium according to claim 14, wherein the instructions, when executed by the network device, further cause the network device to:
- increase a priority of the data that is about to time out when the regular data comprises data that is about to time out, wherein the data that is about to time out is data whose stay duration in the network device exceeds a duration threshold.

17. The non-transitory computer storage medium according to claim 14, wherein the instructions, when executed by the network device, further cause the network device to:
- send data in the high-priority queue and data in the low-priority queue to the second network device, the sending of the data in the high-priority queue is prior to the sending of the data in the low-priority queue, the VR burst data is placed in the high-priority queue, and the regular data is placed in the low-priority queue.

18. The non-transitory computer storage medium according to claim 17, wherein the instructions, when executed by the network device, further cause the network device to:
- transfer the associated data from the low-priority queue to the high-priority queue when the low-priority queue comprises the associated data, wherein the associated data is the regular data associated with the VR burst data.

19. The non-transitory computer storage medium according to claim 17, wherein the instructions, when executed by the network device, further cause the network device to:
- transfer the data that is about to time out from the low-priority queue to the high-priority queue when the low-priority queue comprises the data that is about to time out, wherein the data that is about to time out is the data whose stay duration in the network device exceeds the duration threshold.

* * * * *